US012634622B2

(12) United States Patent
Lee

(10) Patent No.: US 12,634,622 B2
(45) Date of Patent: May 19, 2026

(54) APPARATUS FOR PROVIDING A SOUND

(71) Applicant: LG DISPLAY CO., LTD., Seoul (KR)

(72) Inventor: Sungtae Lee, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 384 days.

(21) Appl. No.: 18/241,285

(22) Filed: Sep. 1, 2023

(65) Prior Publication Data

US 2024/0080613 A1 Mar. 7, 2024

(30) Foreign Application Priority Data

Sep. 5, 2022 (KR) ........................ 10-2022-0112329

(51) Int. Cl.

| | |
|---|---|
| ***H04R 1/28*** | (2006.01) |
| ***H04R 1/02*** | (2006.01) |
| ***H04R 9/02*** | (2006.01) |
| ***H04R 9/04*** | (2006.01) |
| ***H04R 9/06*** | (2006.01) |

(52) U.S. Cl.

CPC ........... *H04R 1/2826* (2013.01); *H04R 1/023* (2013.01); *H04R 1/025* (2013.01); *H04R 9/06* (2013.01); *H04R 9/025* (2013.01); *H04R 9/046* (2013.01); *H04R 2400/11* (2013.01); *H04R 2499/15* (2013.01)

(58) Field of Classification Search

CPC ...... H04R 1/2826; H04R 1/023; H04R 1/025; H04R 9/06; H04R 9/025; H04R 9/046; H04R 2400/11; H04R 2499/15

USPC ........................................................ 381/333

See application file for complete search history.

(56) References Cited

U.S. PATENT DOCUMENTS

2007/0280499 A1 12/2007 Foletta
2015/0289043 A1 10/2015 Liu et al.

FOREIGN PATENT DOCUMENTS

EP 3226069 10/2017
EP 3534206 6/2025
KR 20140098465 A * 8/2014 ............. H04R 1/023

OTHER PUBLICATIONS

Examination Report dated Nov. 24, 2025, Issued in Indian Patent Application No. 202314058470.

* cited by examiner

*Primary Examiner* — Sean H Nguyen
(74) *Attorney, Agent, or Firm* — PnK IP LLC

(57) ABSTRACT

An apparatus includes a vibration member, a supporting member disposed at a rear surface of the vibration member, the supporting member including at least one first hole, a vibration apparatus accommodated into the at least one first hole, the vibration apparatus including a plurality of second holes, and a cover member covering the plurality of second holes.

22 Claims, 7 Drawing Sheets

APPARATUS FOR PROVIDING A SOUND

CROSS-REFERENCE TO RELATED APPLICATION

This application claims the priority of the Korean Patent Application No. 10-2022-0112329 filed on Sep. 5, 2023, which is hereby incorporated by reference in its entirety.

BACKGROUND

Field of the Disclosure

The present disclosure relates to an apparatus for providing sound.

Description of the Background

Apparatus include a separate speaker or sound apparatus, for providing a sound. When a speaker is provided in an apparatus, a problem occurs where the design and space arrangement of the apparatus are limited due to a space occupied by the speaker.

However, because a sound output from the speaker of the display apparatus may travel to a rearward or a downward direction of the display apparatus, sound quality may be degraded due to interference between sounds reflected from a wall and the ground. For this reason, it may be difficult to transfer an accurate sound, and the immersion experience of a viewer is reduced.

SUMMARY

Accordingly, the present disclosure is directed to an apparatus for providing sound that substantially obviates one or more of problems due to limitations and disadvantages described above.

More specifically, the present disclosure is provide an apparatus which may vibrate a vibration member to generate a vibration or a sound and may enhance a sound characteristic and/or a sound pressure level characteristic.

The present disclosure is also to provide an apparatus which may vibrate a vibration member to generate a vibration or a sound and may enhance a sound characteristic and/or a sound pressure level characteristic of a low pitched sound band.

In addition, the present disclosure is also to provide an apparatus which may efficiently dissipate heat, occurring in a vibration apparatus, through a frame of the vibration apparatus.

Further, the present disclosure is to provide an apparatus which may prevent the penetration of particles from the outside through a frame of a vibration apparatus.

The present disclosure is not limited to the aforesaid, but other features not described herein will be clearly understood by those skilled in the art from descriptions below.

Additional features and advantages of the disclosure will be set forth in the description which follows and in part will be apparent from the description, or may be learned by practice of the disclosure. Other advantages of the present disclosure will be realized and attained by the structure particularly pointed out in the written description and claims hereof as well as the appended drawings.

To achieve these and other advantages and in accordance with the present disclosure, as embodied and broadly described, an apparatus includes a vibration member, a supporting member which is at a rear surface of the vibration member and includes at least one first hole, and a vibration apparatus. The vibration apparatus may be accommodated into the at least one first hole and may include a plurality of second holes. The apparatus may include a cover member covering the plurality of second holes.

Details of other aspects are included in the detailed description and the drawings.

An apparatus according to an aspect of the present disclosure may include a vibration apparatus vibrating a vibration member or a display panel, and thus, may generate a sound so that the sound travels in a forward direction of the vibration member or the display panel.

In another aspect of the present disclosure, an apparatus includes an internal space between a vibration member and a supporting member may communicate with an external space through an air penetration hole provided in a frame of a vibration apparatus, and thus, an air pressure of the internal space may decrease, thereby enhancing a vibration characteristic of the vibration member and outputting a sound where a sound pressure level characteristic and/or a sound characteristic of a low pitched sound band are/is enhanced.

In an apparatus according to an aspect of the present disclosure, an air penetration hole communicating with the outside may be provided in a frame of a vibration apparatus including a metal material having excellent heat conductivity, and thus, heat occurring in the vibration apparatus may be efficiently discharged through a convection current as well as heat conduction.

In an apparatus according to an aspect of the present disclosure, a cover member having a mesh structure and having fine porosity may be provided in an air penetration hole provided in a frame of a vibration apparatus, thereby preventing the penetration of particles from the outside.

The effects of the present disclosure are not limited to the aforesaid, but other effects not described herein will be clearly understood by those skilled in the art from descriptions below.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate aspects of the disclosure and together with the description serve to explain the principle of the disclosure.

In the drawings.

DETAILED DESCRIPTION

Figure 1:
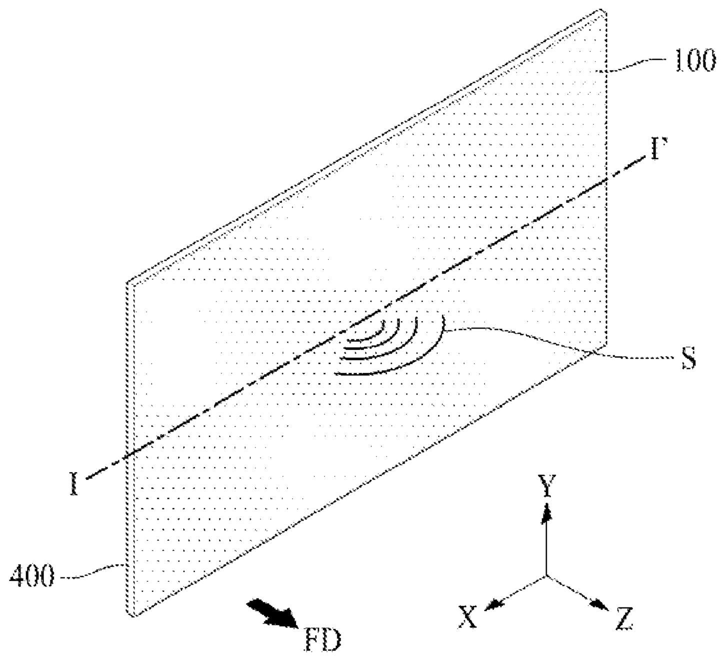
FIG. 1 illustrates an apparatus according to an aspect of the present disclosure.

Advantages and features of the present disclosure, and implementation methods thereof will be clarified through following aspects described with reference to the accompanying drawings. The present disclosure may, however, be embodied in different forms and should not be construed as limited to the aspects set forth herein. Rather, these aspects are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing aspects of the present disclosure are merely an example, and thus, the present disclosure is not limited to the illustrated details. Like reference numerals refer to like elements throughout the specification. In the following description, when the detailed description of the relevant known function or configuration is determined to unnecessarily obscure the important point of the present disclosure, the detailed description will be omitted.

In a case where 'comprise', 'have', and 'include' described in the present specification are used, another part may be added unless 'only~' is used. The terms of a singular form may include plural forms unless referred to the contrary.

In construing an element, the element is construed as including an error range although there is no explicit description.

In describing a position relation ship, for example, when the position relationship is described as 'upon~', 'above~', 'below~', and 'next to~', one or more portions may be arranged between two other portions unless 'just' or 'direct' is used.

In describing a temporal relationship, for example, when the temporal order is described as "after," "subsequent," "next," and "before," a case which is not continuous may be included, unless "just" or "direct" is used.

It will be understood that, although the terms "first", "second", etc. may be used herein to describe various elements, these elements should not be limited by these terms. These terms are only used to partition one element from another. For example, a first element could be termed a second element, and, similarly, a second element could be termed a first element, without departing from the scope of the present disclosure.

In describing elements of the present disclosure, the terms "first," "second," "A," "B," "(a)," "(b)," etc. may be used. These terms are intended to identify the corresponding elements from the other elements, and basis, order, or number of the corresponding elements should not be limited by these terms. The expression that an element is "connected," "coupled," or "adhered" to another element or layer the element or layer may not only be directly connected or adhered to another element or layer, but also be indirectly connected or adhered to another element or layer with one or more intervening elements or layers "disposed," or "interposed" between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

In the present disclosure, examples of an apparatus may include a narrow-sense display apparatus such as an organic light emitting display (OLED) module or a liquid crystal module (LCM) including a display panel and a driver for driving the display panel. Also, examples of the display apparatus may include a set device (or a set apparatus) or a set electronic apparatus such as a notebook computer, a TV, a computer monitor, an equipment apparatus including an automotive apparatus or another type apparatus for vehicles, or a mobile electronic device such as a smartphone or an electronic pad, which is a complete product (or a final product) including an LCM or an OLED module.

Therefore, in the present disclosure, examples of the apparatus may include a narrow-sense display apparatus itself, such as an LCM or an OLED module, and a set device which is a final consumer device or an application product including the LCM or the OLED module.

In some aspects, an LCM or an OLED module including a display panel and a driver may be referred to as a narrow-sense display apparatus, and an electronic apparatus which is a final product including an LCM or an OLED module may be referred to as a set apparatus. For example, the narrow-sense display apparatus may include a display panel, such as an LCD or an OLED, and a source printed circuit board (PCB) which is a controller for driving the display panel. The set apparatus may further include a set PCB which is a set controller electrically connected to the source PCB to overall control the set apparatus.

A display panel applied to the present aspect may use all types of display panels such as a liquid crystal display panel, an organic light emitting diode (OLED) display panel, and an electroluminescent display panel, but aspects of the present disclosure are not limited to a specific display panel, which is vibrated by a sound generation device according to the present aspect to output a sound. Also, a shape or a size of a display panel applied to a display apparatus according to the present aspect is not limited.

For example, when the display panel is the liquid crystal display panel, the display panel may include a plurality of gate lines, a plurality of data lines, and a plurality of pixels respectively provided in a plurality of pixel areas defined by intersections of the gate lines and the data lines. Also, the display panel may include an array substrate including a thin film transistor (TFT) which is a switching element for adjusting a light transmittance of each of the plurality of pixels, an upper substrate including a color filter and/or a black matrix, and a liquid crystal layer between the array substrate and the upper substrate.

Moreover, when the display panel is the organic light emitting display panel, the display panel may include a plurality of gate lines, a plurality of data lines, and a plurality of pixels respectively provided in a plurality of pixel areas defined by intersections of the gate lines and the data lines. Also, the display panel may include an array substrate including a TFT which is an element for selectively applying a voltage to each of the pixels, an organic light emitting device layer on the array substrate, and an encapsulation substrate disposed at the array substrate to cover the organic light emitting device layer. The encapsulation substrate may protect the TFT and the organic light emitting device layer from an external impact and may prevent water or oxygen from penetrating into the organic light emitting device layer. Also, a layer provided on the array substrate may include an inorganic light emitting layer (for example, a nano-sized material layer, a quantum dot, or the like). As another aspect of the present disclosure, the layer provided on the array substrate may include a micro light emitting diode.

The display panel may further include a backing such as a metal plate attached on the display panel. However, the present aspect is not limited to the metal plate, and the display panel may include another structure.

Features of various aspects of the present disclosure may be partially or overall coupled to or combined with each other, and may be variously inter-operated with each other and driven technically as those skilled in the art may sufficiently understand. The aspects of the present disclosure may be carried out independently from each other, or may be carried out together in co-dependent relationship.

Hereinafter, aspects of the present disclosure will be described in detail with reference to the accompanying drawings. For convenience of description, a scale of each of elements illustrated in the accompanying drawings differs from a real scale, and thus, is not limited to a scale illustrated in the drawings.

Figure 2:
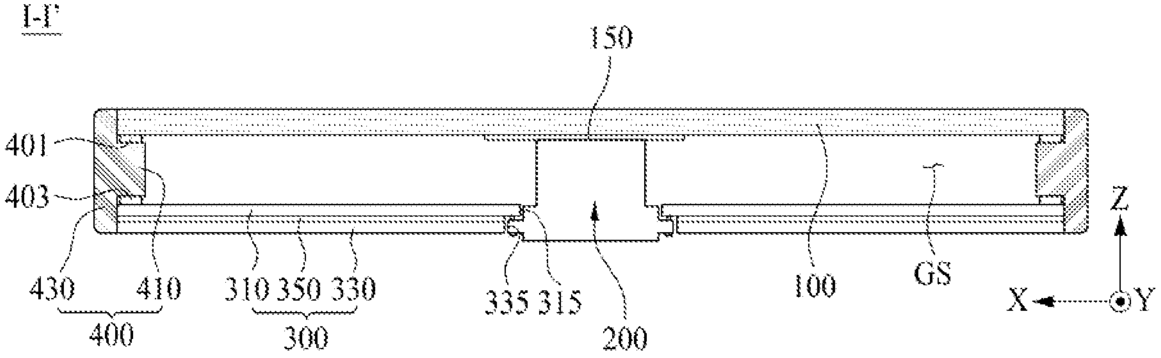
FIG. 2 is a cross-sectional view taken along line I-I' illustrated in FIG. 1.

FIG. 1 illustrates an apparatus according to an aspect of the present disclosure, and FIG. 2 is a cross-sectional view taken along line I-I' illustrated in FIG. 1.

With reference to FIGS. 1 and 2, the apparatus according to an aspect of the present disclosure may include a vibration member 100 and a vibration apparatus 200 disposed at a rear surface (or a backside) of the vibration member 100. For example, the vibration member 100 may be a vibration object, a display panel, a vibration plate, or a front member, but aspects of the present disclosure are not limited thereto. Hereinafter, an example where a vibration member is a display panel will be described.

The vibration member 100 according to an aspect of the present disclosure may be a display panel displaying an image. The display panel may display an electronic image, a digital image, a still image or a video image. For example, the display panel may output light to display an image. The display panel may be a curved display panel, or may be any type of display panel, such as a liquid crystal display panel, an organic light-emitting display panel, a quantum dot light-emitting display panel, a micro light-emitting diode display panel, and an electrophoresis display panel. The display panel may be a flexible display panel. For example, the display panel may a flexible light emitting display panel, a flexible electrophoretic display panel, a flexible electro-wetting display panel, a flexible micro light emitting diode display panel, or a flexible quantum dot light emitting display panel, but aspects of the present disclosure are not limited thereto.

The display panel according to an aspect of the present disclosure may include a display area (or an active area) for displaying an image according to driving of the plurality of pixels. The display panel may include a non-display area (or an inactive area) surrounding the display area, but aspects of the present disclosure are not limited thereto.

The display panel according to an aspect of the present disclosure may include an anode electrode, a cathode electrode, and a light emitting device, and may be configured to display an image in a type such as a top emission type, a bottom emission type, or a dual emission type, according to a structure of a pixel array layer including a plurality of pixels. In the top emission type, an image may be displayed by outputting visible light generated from the pixel array layer to the forward region of a base substrate. In the bottom emission type, an image may be displayed by outputting visible light generated from the pixel array layer to the backward region of the base substrate.

The display panel according to an aspect of the present disclosure may include a pixel array portion disposed at the substrate. The pixel array portion may include a plurality of pixels which display an image based on a signal supplied through the signal lines. The signal lines may include a gate line, a data line and a pixel driving power line, or the like, but aspects of the present disclosure are not limited thereto.

Each of the plurality of pixels may include a pixel circuit layer including a driving thin film transistor (TFT) provided at the pixel area which is configured by a plurality of gate lines and/or a plurality of data lines, an anode electrode electrically connected to the driving TFT, a light emitting layer formed over the anode electrode, and a cathode electrode electrically connected to the light emitting layer.

The driving TFT may be configured at a transistor region of each pixel area provided at a substrate. The driving TFT may include a gate electrode, a gate insulation layer, a semiconductor layer, a source electrode, and a drain electrode. The semiconductor layer of the driving TFT may include silicon such as amorphous silicon (a-Si), polysilicon (poly-Si), or low temperature poly-Si or may include oxide such as indium-gallium-zinc-oxide (IGZO), but aspects of the present disclosure are not limited thereto.

The anode electrode may be provided at an opening region provided at each pixel area and may be electrically connected to the driving TFT.

A light emitting device according to an aspect of the present disclosure may include an organic light emitting device layer formed over an anode electrode. The organic light emitting device layer may be implemented to emit light having the same color (for example, white light) for each pixel, or may be implemented to emit light having a different color (for example, red light, green light, or blue light) for each pixel. A cathode electrode (or a common electrode) may be connected to the organic light emitting device layer provided in each pixel area in common. For example, the organic light emitting device layer may have a stack structure including a single structure or two or more structures including the same color for each pixel. As another aspect of the present disclosure, the organic light emitting device layer may have a stack structure including two or more structures including one or more different colors for each pixel. The two or more structures including the one or more different colors may be configured with one or more of blue, red, yellow-green, and green or a combination thereof, but aspects of the present disclosure are not limited thereto. An example of the combination may include blue and red, red and yellow-green, red and green, red/yellow-green/green, or the like, but aspects of the present disclosure are not limited thereto. Also, regardless of a stack order thereof, the present disclosure may be applied. The stack structure including two or more structures having the same color or one or more different colors may further include a charge generating layer between the two or more structures. The charge generating layer may have a PN junction structure and may include an N-type charge generating layer and a P-type charge generating layer.

According to another aspect of the present disclosure, the light emitting device may include a micro light emitting diode device electrically connected to each of an anode electrode and a cathode electrode. The micro light emitting diode device may be a light emitting diode implemented as an integrated circuit (IC) or chip type. The micro light emitting diode device may include a first terminal electrically connected to the anode electrode and a second terminal electrically connected to the cathode electrode. The cathode electrode may be connected to the second terminal of the micro light emitting diode device provided in each pixel area in common.

An encapsulation part may be formed on the substrate to surround the pixel array portion, thereby preventing oxygen or water from penetrating into the light emitting device layer of the pixel array portion. The encapsulation part according to an aspect of the present disclosure may be formed in a multi-layer structure where an organic material layer and an inorganic material layer are alternately stacked, but the term is not limited thereto. The inorganic material layer may prevent oxygen or water from penetrating into the light emitting device layer of the pixel array portion. The organic material layer may be formed to have a thickness which is relatively thicker than the inorganic material layer, to cover particles occurring in a manufacturing process. For example, the encapsulation part may include a first inorganic layer, an organic layer on the first inorganic layer, and a second inorganic layer on the organic layer. The organic layer may be a particle cover layer. The touch panel may be disposed at the encapsulation part, or may be disposed at a rear surface of the pixel array portion.

The display panel according to an aspect of the present disclosure may include a first substrate, a second substrate, and a liquid crystal layer. The first substrate may be an upper substrate or a thin film transistor (TFT) array substrate. For example, the first substrate may include a pixel array (or a display part or a display area) including a plurality of pixels which are respectively provided in a plurality of pixel areas defined by intersections between a plurality of gate lines and/or a plurality of data lines. Each of the plurality of pixels may include a TFT connected to a gate line and/or a data line, a pixel electrode connected to the TFT, and a common electrode which is provided adjacent to the pixel electrode and is supplied with a common voltage.

The first substrate may further include a pad part provided at a first periphery (or a first non-display part) and a gate driving circuit provided at a second periphery (or a second non-display part).

The pad part may supply a signal, supplied from the outside, to the pixel array and/or the gate driving circuit. For example, the pad part may include a plurality of data pads connected to a plurality of data lines through a plurality of data link lines and/or a plurality of gate input pads connected to the gate driving circuit through a gate control signal line. For example, a size of the first substrate may be greater than the second substrate, but aspects of the present disclosure are not limited thereto.

The gate driving circuit (or a scan driving circuit) according to an aspect of the present disclosure may be embedded (or integrated) into a second periphery of the first substrate to be connected to the plurality of gate lines. For example, the gate driving circuit may be implemented with a shift register including a transistor, which is formed through the same process as the TFT provided at the pixel area. According to another aspect of the present disclosure, the gate driving circuit may be implemented as an integrated circuit (IC) and may be provided at a panel driving circuit, without being embedded into the first substrate.

The second substrate may be a lower substrate or a color filter array substrate. For example, the second substrate may include a pixel pattern (or a pixel defining pattern or a black matrix) including an opening area overlapping with the pixel area formed in the first substrate, and a color filter layer formed at the opening area. The second substrate may have a size which is smaller than the first substrate, but aspects of the present disclosure are not limited thereto. For example, the second substrate may overlap with a remaining portion, other than the first periphery, of the upper substrate. The second substrate may be attached to a remaining portion, other than the first periphery, of the first substrate with a liquid crystal layer therebetween using a sealant.

The liquid crystal layer may be disposed between the first substrate and the second substrate. The liquid crystal layer may include a liquid crystal including liquid crystal molecules where an alignment direction thereof is changed based on an electric field generated by the common voltage and a data voltage applied to a pixel electrode for each pixel.

A second polarization member may be attached on a bottom surface of the second substrate and may polarize light which is incident from the backlight and travels to the liquid crystal layer. A first polarization member may be attached on a top surface of the first substrate and may polarize light which passes through the first substrate and is output to the outside.

The display panel according to an aspect of the present disclosure may drive the liquid crystal layer based on an electric field which is generated in each pixel by the data voltage and the common voltage applied to each pixel, and thus, may display an image based on light passing through the liquid crystal layer.

In display panel according to another aspect of the present disclosure, the first substrate may be implemented as the color filter array substrate, and the second substrate may be implemented as the TFT array substrate. For example, the display panel according to another aspect of the present disclosure may have a type where an upper portion and a lower portion of the display panel according to an aspect of the present disclosure are reversed therebetween. For example, a pad part of the display panel according to another aspect of the present disclosure may be covered by a separate mechanism or structure.

The display panel according to an aspect of the present disclosure may include a bending portion that may be bent or curved to have a curved shape or a certain curvature radius.

The bending portion of the display panel may be in at least one or more of one periphery and the other periphery of the display panel, which are parallel to each other. The one periphery and/or the other periphery, where the bending portion is implemented, of the display panel may include only the non-display area, or may include a periphery of the display area and the non-display area. The display panel including the bending portion implemented by bending of the non-display area may have a one-side bezel bending structure or a both-side bezel bending structure. Also, the display panel including the bending portion implemented by bending of the periphery of the display area and the non-display area may have a one-side active bending structure or a both-side active bending structure.

According to another aspect of the present disclosure, the vibration member 100 may include one or more of metal, wood, rubber, plastic, carbon, glass, cloth, fiber, paper, mirror, and leather, but aspects of the present disclosure are not limited thereto. For example, the paper may be a cone paper for speakers. For example, the cone paper may be pulp or foam plastic, but aspects of the present disclosure are not limited thereto.

According to another aspect of the present disclosure, the vibration member 100 may include one or more of a display panel including a pixel displaying an image, a screen panel on which an image is projected from a display apparatus, a lighting panel, a signage panel, a vehicular (or car or automotive) interior material, a vehicular glass window, a vehicular exterior material, a ceiling material of a building, an interior material of a building, a glass window of a building, and mirror, but aspects of the present disclosure are not limited thereto. For example, the display panel may be a curved display panel or all types of display panels such as a liquid crystal display panel, an organic light emitting display panel, a quantum dot light emitting display panel, a micro light emitting diode display panel, and an electrophoresis display panel. For example, the display panel may be a flexible display panel. For example, the flexible display panel may be a flexible light emitting display panel, a flexible electrophoresis display panel, a flexible electro-wetting display panel, a flexible micro light emitting diode display panel, or a flexible quantum dot light emitting display panel, but aspects of the present disclosure are not limited thereto. For example, a lighting panel (or a non-display panel) may be a light emitting diode lighting panel (or apparatus), an organic light emitting diode lighting panel (or apparatus), or an inorganic light emitting diode lighting panel (or apparatus), but aspects of the present disclosure are not limited thereto.

The vibration apparatus 200 may vibrate the vibration member 100. For example, the vibration apparatus 200 may be implemented at a rear surface of the vibration member 100. For example, the vibration apparatus 200 may vibrate the vibration member 100 at the rear surface of the vibration member 100, and thus, may provide a user with a sound S and/or a haptic feedback, based on a vibration of the vibration member 100. For example, the vibration member 100 may output the sound S, based on a vibration of the vibration apparatus 200. The vibration apparatus 200 may output the sound S by using the vibration member 100 as a vibration plate. For example, the vibration apparatus 200 may output the sound S in a forward (or front) direction FD) of the vibration member 100 by using the vibration member 100 as a vibration plate. For example, the vibration apparatus 200 may generate the sound S so that the sound travels in a forward (or front) direction FD of the display panel or the vibration member 100. The vibration apparatus 200 may vibrate the vibration member 100 to output the sound S. For example, the vibration apparatus 200 may directly vibrate the vibration member 100 to output the sound S in the forward (or front) direction FD of the apparatus.

According to an aspect of the present disclosure, the vibration apparatus 200 may vibrate based on a vibration driving signal synchronized with an image displayed by the display panel corresponding to the vibration member 100 to vibrate the display panel. According to an aspect of the present disclosure, the vibration apparatus 200 may vibrate based on a haptic feedback signal (or a tactile feedback signal) synchronized with a user touch applied to a touch panel (or a touch sensor layer) disposed in or embedded into the display panel 100 to vibrate the display panel. Accordingly, the display panel may vibrate based on a vibration of the vibration apparatus 200 to provide a user (or a viewer) with at least one of the sound S and the haptic feedback.

The vibration apparatus 200 according to an aspect of the present disclosure may pass through the supporting member 300 and may contact the rear surface of the vibration member 100, and thus, may directly vibrate the vibration member 100. For example, an upper portion of the vibration apparatus 200 may be inserted (or accommodated) into through holes 315 and 335 (or a first hole) provided in the supporting member 300 and may be connected with the rear surface of the vibration member 100, and a lower portion of the vibration apparatus 200 may be supported by (or fixed to) the supporting member 300. For example, the vibration apparatus 200 may vibrate by using the supporting member 300 as a supporter to vibrate the vibration member 100, and the vibration member 100 may output the sound S in the forward direction FD. For example, the vibration apparatus 200 may be a transducer, an actuator, or an exciter, but the terms are not limited thereto.

The apparatus according to an aspect of the present disclosure may further include a heat dissipation member 150 which is disposed at the rear surface of the vibration member 100.

The heat dissipation member 150 may be disposed between the vibration member 100 and the vibration apparatus 200. The heat dissipation member 150 may be provided between the vibration member 100 and the vibration apparatus 200 and may reduce or decrease heat occurring in the vibration apparatus 200. For example, the heat dissipation member 150 may prevent or minimize the transfer of heat, occurring in the vibration apparatus 200, to the vibration member 100. The heat dissipation member 150 may limit the local temperature rising of the vibration member 100 caused by heat occurring in the vibration apparatus 200. For example, the heat dissipation member 150 may prevent or minimize the transfer of heat, occurring in the vibration apparatus 200, to the display panel which is the vibration member 100. In this case, the heat dissipation member 150 may limit the temperature rising of the display panel or the vibration member 100 caused by heat which occurs due to an operation of the vibration apparatus 200 when the display panel or the vibration member 100 outputs a sound, and thus, may prevent an image quality defect of the display panel or the vibration member 100 from occurring due to a rapid temperature difference in a local region of the display panel or the vibration member 100 overlapping with the vibration apparatus 200.

According to an aspect of the present disclosure, the heat dissipation member 150 may be disposed on the rear surface of the display panel or the vibration member 100 by using an adhesive member. The heat dissipation member 150 may be configured to cover the vibration apparatus 200 or to have a size which is greater than that of the vibration apparatus 200. The heat dissipation member 150 may have a polygonal plate shape or a circular plate shape having a certain thickness, but aspects of the present disclosure are not limited thereto. For example, the heat dissipation member 150 may be a heat dissipation sheet or a heat dissipation tape including a metal material, having high heat conductivity, such as aluminum (Al), copper (Cu), or silver (Ag) or an alloy thereof, but aspects of the present disclosure are not limited thereto. Accordingly, because the apparatus according to an aspect of the present disclosure further includes the heat dissipation member 150, an adverse effect of heat occurring when the vibration apparatus 200 is vibrating may be reduced on the display panel or the vibration member 100 or the image quality of the display panel.

The apparatus according to an aspect of the present disclosure may further include a supporting member 300 which is disposed at a rear surface (or a backside surface) of the vibration member 100.

The supporting member 300 may be disposed at the rear surface of the vibration member 100 or the display panel. For example, the supporting member 300 may cover the rear surface of the vibration member 100 or the display panel. For example, the supporting member 300 may cover the whole rear surface of the vibration member 100 or the display panel with a gap space GS (or an internal space) therebetween. The supporting member 300 may be apart from a rearmost surface of the vibration member 100 or the display panel with the gap space GS therebetween, or may be apart from the vibration apparatus 200. For example, the gap space GS may be referred to as an internal space, an air gap, a vibration space, or a sound sounding box, but the terms are not limited thereto.

For example, the supporting member 300 may include one or more materials of a glass material, a metal material, and a plastic material. For example, the supporting member 300 may be a rear structure material, a set structure material, a supporting structure material, a supporting cover, a rear member, a case, or a housing, but the terms are not limited thereto. The supporting member 300 may be referred to as the other term such as a cover bottom, a plate bottom, a back cover, a base frame, a metal frame, a metal chassis, a chassis base, or an m-chassis. For example, the supporting member 300 may be implemented as an arbitrary type frame or a plate structure material each disposed at the rear surface of the vibration member 100.

An edge or a sharp corner of the supporting member 300 may have an inclined shape or a curved shape through a chamfer process or a corner rounding process. For example, the glass material of the supporting member 300 may be sapphire glass. In another aspect of the present disclosure, the supporting member 300 including the metal material may include one or more materials of aluminum (Al), an Al alloy, magnesium (Mg), a Mg alloy, and an iron (Fe)-nickel (Ni) alloy.

The supporting member 300 according to an aspect of the present disclosure may include the through holes 315 and 335 (or the first hole) into which the vibration apparatus 200 is inserted (or accommodated). For example, the through holes 315 and 335 may be punched to have a circular or polygonal shape in a predetermined partial region of the supporting member 300 in a thickness direction Z of the supporting member 300, so that the vibration apparatus 200 is inserted (or accommodated) therein.

According to an aspect of the present disclosure, the through holes 315 and 335 (or the first hole) may be provided for decreasing an air pressure of the gap space GS (or the internal space) between the vibration member 100 and the supporting member 300. For example, the through holes 315 and 335 may provide a path into which the vibration apparatus 200 may be inserted (or accommodated) and may provide a path which enables the gap space GS between the vibration member 100 and the supporting member 300 to be connected or communicate with the outside. In this case, the vibration apparatus 200 may include an air penetration hole (or a second hole) which is formed in a portion overlapping with the through holes 315 and 335. For example, the air penetration hole of the vibration apparatus 200 may be formed to pass through or vertically pass through a portion, overlapping with each of the through holes 315 and 335, of the vibration apparatus 200. Therefore, the gap space GS between the vibration member 100 and the supporting member 300 or an inner portion of the vibration apparatus 200 may be connected or communicate with the outside through the through holes 315 and 335 of the supporting member 300 and the air penetration hole of the vibration apparatus 200, and thus, an air pressure of the gap space GS between the vibration member 100 and the supporting member 300 or an air pressure of the inner portion of the vibration apparatus 200 may be reduced.

The supporting member 300 according to an aspect of the present disclosure may include a first supporting member 310 and a second supporting member 330.

The first supporting member 310 may be disposed between the second supporting member 330 and the rear surface of the vibration member 100 or the display panel. For example, the first supporting member 310 may be disposed between a rear edge of the vibration member 100 or the display panel and a front edge portion of the second supporting member 330. The first supporting member 310 may support one or more of an edge portion of the vibration member 100 or the display panel and an edge portion of the second supporting member 330. In another aspect of the present disclosure, the first supporting member 310 may cover the rear surface of the vibration member 100 or the display panel. For example, the first supporting member 310 may cover the whole rear surface of the vibration member 100 or the display panel. For example, the first supporting member 310 may be a member which covers the whole rear surface of the vibration member 100 or the display panel. For example, the first supporting member 310 may include one or more materials of a glass material, a metal material, and a plastic material. For example, the first supporting member 310 may be an inner plate, a first rear structure material, a first supporting structure material, a first supporting cover, a first back cover, a first rear member, an internal plate, or an internal cover, but the terms are not limited thereto. For example, the first supporting member 310 may be omitted.

The first supporting member 310 may be apart from a rearmost surface of the vibration member 100 with the gap space GS therebetween. The first supporting member 310 may support or fix the vibration apparatus 200. For example, the gap space GS may be referred to as an internal space, an air gap, a vibration space, or a sound sounding box, but the terms are not limited thereto.

The second supporting member 330 may be disposed at a rear surface of the first supporting member 310. The second supporting member 330 may be a member which covers the whole rear surface of the vibration member 100 or the display panel. For example, the second supporting member 330 may include one or more materials of a glass material, a metal material, and a plastic material. For example, the second supporting member 330 may be an outer plate, a rear plate, a back plate, a back cover, a rear cover, a second rear structure material, a second supporting structure material, a second supporting cover, a second back cover, a second rear member, an external plate, or an external cover, but the terms are not limited thereto.

According to an aspect of the present disclosure, the first supporting member 310 and the second supporting member 330 may each include through holes 315 and 335 (or a first hole) into which the vibration apparatus 200 is inserted (or accommodated). For example, the through holes 315 and 335 may be punched to have a circular or polygonal shape in a predetermined partial region of each of the first supporting member 310 and the second supporting member 330 in a thickness direction Z of the first supporting member 310 and the second supporting member 330, so that the vibration apparatus 200 is inserted (or accommodated) therein. For example, the first supporting member 310 may include a first through hole 315, and the second supporting member 330 may include a second through hole 335. For example, the first through hole 315 of the first supporting member 310 may have the same size as that of the second through hole 335 of the second supporting member 330, or may have a size which is less than that of the second through hole 335 of the second supporting member 330. For example, the first through hole 315 of the first supporting member 310 may have a size which is less than that of the second through hole 335 of the second supporting member 330, and a portion of the rear surface of the first supporting member 310 may be exposed through the second through hole 335 of the second supporting member 330. In this case, the vibration apparatus 200 may be fixed to the rear surface of the first supporting member 310 exposed by the second through hole 335 of the second supporting member 330. For example, an upper portion (or one side) of the vibration apparatus 200 may pass through the through holes 315 and 335 of the first supporting member 310 and the second supporting member 330 and may contact the rear surface of the vibration member 100, and a lower portion (or the other side) of the vibration apparatus 200 may be fixed to the rear surface of the first supporting member 310 exposed by the second through hole 335 of the second supporting member 330.

According to an aspect of the present disclosure, the first supporting member 310 and the second supporting member 330 may include different materials. For example, the first supporting member 310 may include a metal material such as an Al material which is good in heat conductivity, and the second supporting member 330 may include a glass material, but aspects of the present disclosure are not limited thereto.

According to an aspect of the present disclosure, the first supporting member 310 and the second supporting member 330 may have the same thickness or different thicknesses. For example, the first supporting member 310 may have a thickness which is relatively thinner than the second supporting member 330, but aspects of the present disclosure are not limited thereto.

The supporting member 300 according to an aspect of the present disclosure may further include a connection member 350.

The connection member 350 may be disposed between the first supporting member 310 and the second supporting member 330. For example, the first supporting member 310 and the second supporting member 330 may be coupled to or connected with each other by the connection member 350. For example, the connection member 350 may be an adhesive resin, a double-sided tape, or a double-sided adhesive foam pad, but aspects of the present disclosure are not limited thereto. For example, the connection member 350 may have elasticity for absorbing an impact, but aspects of the present disclosure are not limited thereto. For example, the connection member 350 may be disposed in a whole region between the first supporting member 310 and the second supporting member 330. According to another aspect of the present disclosure, the connection member 350 may be formed in a mesh structure having an air gap between the first supporting member 310 and the second supporting member 330.

The apparatus according to an aspect of the present disclosure may further include a middle frame 400. The middle frame 400 may be disposed between a rear edge of the vibration member 100 or the display panel and a front edge of the supporting member 300. The middle frame 400 may support one or more of an edge portion of the vibration member 100 or the display panel and an edge portion of the supporting member 300. The middle frame 400 may surround one or more of lateral surfaces of each of the vibration member 100 or the display panel and the supporting member 300. The middle frame 400 may provide a gap space GS between the vibration member 100 or the display panel and the supporting member 300. The middle frame 400 may be referred to as a middle cabinet, a middle cover, a middle chassis, a connection member, a frame, a frame member, a middle member, or a side cover member, but the terms are not limited thereto.

The middle frame 400 according to an aspect of the present disclosure may include a first supporting portion 410 and a second supporting portion 430. For example, the first supporting portion 410 may be a supporting portion, but the terms are not limited thereto. For example, the second supporting portion 430 may be a sidewall portion, but the terms are not limited thereto.

The first supporting portion 410 may be disposed between the rear edge of the vibration member 100 or the display panel and the front edge of the supporting member 300, and thus, may provide a gap space GS between the vibration member 100 or the display panel and the supporting member 300. A front surface of the first supporting portion 410 may be coupled to or connected with the rear edge portion of the vibration member 100 or the display panel by a first adhesive member 401. A rear surface of the first supporting portion 410 may be coupled to the front edge of the supporting member 300 by a second adhesive member 403. For example, the first supporting portion 410 may have a single tetragonal picture frame structure, or may include a picture frame structure having a plurality of division bar shapes, but aspects of the present disclosure are not limited thereto.

The second supporting portion 430 may be arranged in parallel with the thickness direction Z of the apparatus. For example, the second supporting portion 430 may be vertically coupled to an outer surface of the first supporting part 410 in parallel with the thickness direction Z of the apparatus. The second supporting portion 430 may surround one or more of an outer surface of the vibration member 100 and an outer surface of the supporting member 300, thereby protecting the outer surface of each of the vibration member 100 and the supporting member 300. The first supporting portion 410 may protrude from an inner surface of the second supporting portion 430 to the gap space GS between the vibration member 100 and the supporting member 300.

The apparatus according to an aspect of the present disclosure may include a panel connection member (or a connection member) instead of the middle frame 400.

The panel connection member may be disposed between a rear edge portion of the vibration member 100 and a front edge portion of the supporting member 300, and thus, may provide the gap space GS between the vibration member 100 and the supporting member 300. For example, the panel connection member may be implemented as a double-sided tape, a single-sided tape, or a double-sided adhesive foam pad, but aspects of the present disclosure are not limited thereto. For example, an adhesive layer of the panel connection member may include epoxy, acryl, silicone, or urethane, but aspects of the present disclosure are not limited thereto. For example, the adhesive layer of the panel connection member may include a urethane-based material (or substance) having a relatively ductile characteristic among acryl and urethane, to minimize the transfer of a vibration of the vibration member 100 to the supporting member 300. Accordingly, a vibration of the vibration member 100 transferred to the supporting member 300 may be minimized.

In the apparatus according to an aspect of the present disclosure, when the apparatus includes the panel connection member instead of the middle frame 400, the supporting member 300 may include a bending sidewall which is bent from one side (or an end) of the second supporting member 330 and surrounds one or more of outer surfaces (or outer sidewalls) of the first supporting member 310, the panel connection member, and the vibration member 100. The bending sidewall according to an aspect of the present disclosure may have a single sidewall structure or a hemming structure. The hemming structure may denote a structure where ends of an arbitrary member is bent in a curved shape to overlap with each other, or are spaced apart from each other in parallel. For example, to enhance a sense of beauty in design, the bending sidewall may include a first bending sidewall, which is bent from one side (or an end) of the second supporting member 330, and a second bending sidewall which is bent from the first bending sidewall to a region between the first bending sidewall and the outer surface of the vibration member 100. The second bending sidewall may be apart from an inner surface of the first bending sidewall, to decrease the transfer of an external impact to the outer surface of the vibration member 100 in a lateral direction or a contact between the outer surface of the vibration member 100 and the inner surface of the first bending sidewall. Accordingly, the second bending sidewall may decrease the transfer of the external impact to the outer surface of the vibration member 100 in the lateral direction or a contact between the outer surface of the vibration member 100 and the inner surface of the first bending sidewall.

According to another aspect of the present disclosure, the middle frame 400 may be omitted in the apparatus according to an aspect of the present disclosure. The panel connection member or an adhesive may be provided instead of the middle frame 400. According to another aspect of the present disclosure, a partition may be provided instead of the middle frame 400.

Figure 3:
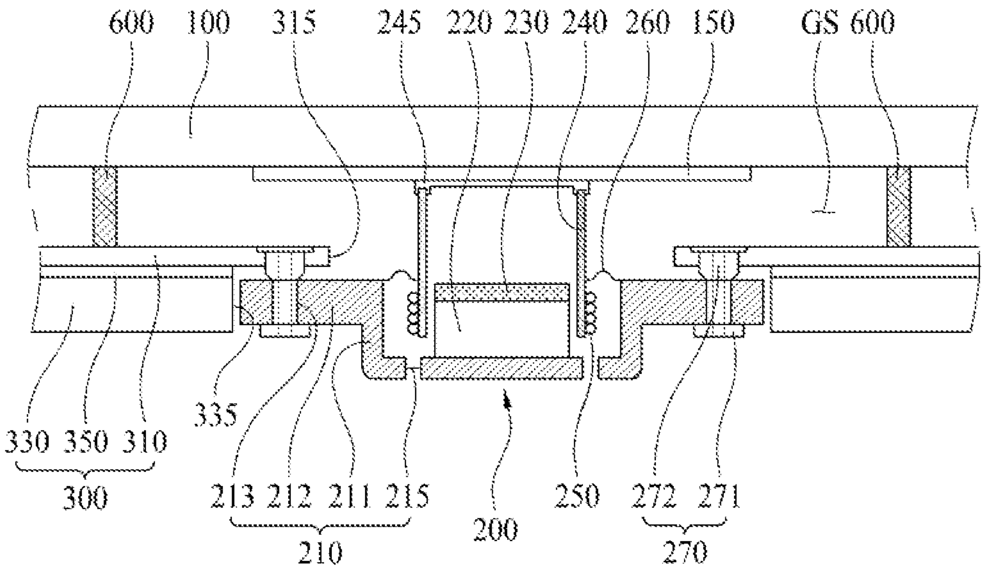
FIG. 3 illustrates a vibration apparatus according to an aspect of the present disclosure.
Figure 4:
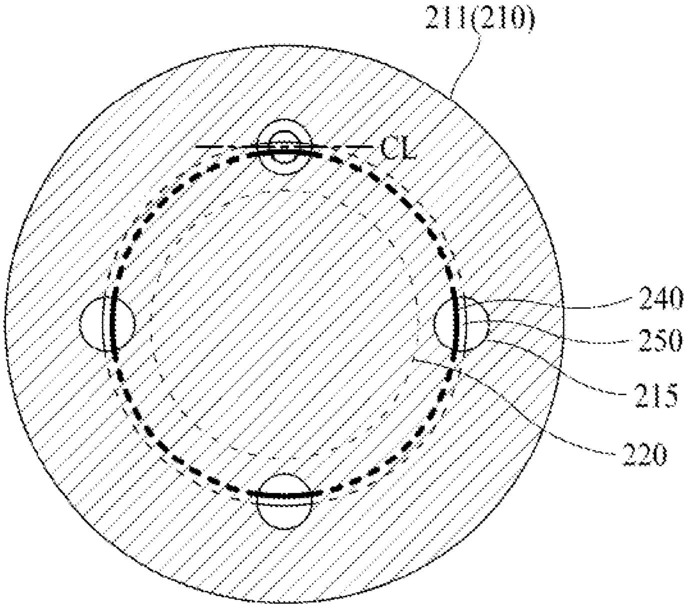
FIG. 4 illustrates an arrangement structure of a hole illustrated in FIG. 3.

FIG. 3 illustrates a vibration apparatus 200 according to an aspect of the present disclosure. FIG. 4 illustrates an arrangement structure of a hole illustrated in FIG. 3.

Referring to FIG. 3, the vibration apparatus 200 according to an aspect of the present disclosure may include a frame 210, a magnet 220, a center pole 230, a bobbin 240, and a coil 250.

The frame 210 may be fixed to the supporting member 300 to overlap with through holes 315 and 335 (or a first hole) of the supporting member 300 and may support the magnet 220. The frame 210 may accommodate the magnet 220, the center pole 230, the bobbin 240, and the coil 250. For example, the magnet 220 may be disposed on the frame 210. For example, the center pole 230 may be disposed on the frame 210. The frame 210 may include a thermal conductive material. The frame 210 may include a first frame 211, accommodating the magnet 220, the center pole 230, the bobbin 240, and the coil 250, and a second frame 212 which protrudes from an edge of the first frame 211. The first frame 211 and the second frame 212 may be provided as one body. The first frame 211 and the second frame 212 may include the same material having heat conductivity and may be provided as one body. For example, the first frame 211 and the second frame 212 may include a material such as iron (Fe), but aspects of the present disclosure are not limited thereto. The first frame 211 and the second frame 212 may be referred to the other terms such as a yoke, but the terms are not limited thereto.

The first frame 211 may accommodate the magnet 220, the center pole 230, the bobbin 240, and the coil 250. For example, an inner portion of the first frame 211 may have a circular pillar shape, an oval pillar shape, or a cylinder shape. The magnet 220 may be disposed on the first frame 211, and the center pole 230 may be disposed on the magnet 220. The first frame 211 may support the magnet 220 and the center pole 230. The first frame 211 may be provided to surround the magnet 220 and the center pole 230 on the first frame 211 and the bobbin 240 and the coil 250 disposed around the center pole 230. For example, the coil 250 may be wound around an outer portion of the bobbin 240.

According to an aspect of the present disclosure, the first frame 211 may further include a plurality of air penetration holes 215 (or second hole).

The plurality of air penetration holes 215 (or second hole) may provide a path which enables an inner portion of the first frame 211, into which the bobbin 240 and the coil 250 are accommodated, to be connected or communicate with the outside. For example, the plurality of air penetration holes 215 may be formed to pass through or vertically pass through the first frame 211. The plurality of air penetration holes 215 (or second hole) may be formed in a portion overlapping with each of the through holes 315 and 335 (or first hole) of the supporting member 300. For example, the plurality of air penetration holes 215 may be formed to pass through or vertically pass through the first frame 211 overlapping with the through holes 315 and 335 of the supporting member 300. Therefore, the gap space GS (or internal space) between the vibration member 100 and the supporting member 300 or the inner portion of the first frame 211 may communicate with the outside through the through holes 315 and 335 of the supporting member 300 and the plurality of air penetration holes 215. For example, the plurality of air penetration holes 215 may connect or communicate the gap space GS between the vibration member 100 and the supporting member 300 with the outside through the through holes 315 and 335 of the supporting member 300. Each of the plurality of air penetration holes 215 may be formed in one shape of a circular shape, an oval shape, and a slit shape, but aspects of the present disclosure are not limited thereto.

The plurality of air penetration holes 215 (or second hole) may be configured to discharge heat, occurring in the bobbin 240 and the coil 250 accommodated into the first frame 211, to the outside. The plurality of air penetration holes 215 may be provided in a portion overlapping with each of the bobbin 240 and the coil 250 accommodated into the first frame 211. For example, the plurality of air penetration holes 215 may be formed to pass through or vertically pass through the portion overlapping with each of the bobbin 240 and the coil 250. The plurality of air penetration holes 215 may be arranged at a certain interval. For example, the plurality of penetration holes 215 may be arranged at a certain interval in a circumference direction of each of the bobbin 240 and the coil 250 accommodated into the first frame 211. A center portion of each of the plurality of air penetration holes 215 may overlap with the bobbin 240 and the coil 250. A size (or diameter) of each of the plurality of air penetration holes 215 may be greater than or equal to a thickness of each of the bobbin 240 and the coil 250. However, aspects of the present disclosure are not limited to the shape or arrangement of the plurality of air penetration holes 215.

The second frame 212 may be formed to protrude from an edge of the first frame 211. The second frame 212 may be provided as one body with the first frame 211. For example, the second frame 212 may have a ring shape which surrounds the first frame 211. A coupling portion 213 fixed to the supporting member 300 may be formed at a portion of the second frame 212. The second frame 212 may be coupled to the supporting member 300 by the connection member 270 fastened to the coupling portion 213. For example, the connection member 270 may include a screw 271 and a nut 272. The nut 272 of the connection member 270 may be fixed to the supporting member 300. For example, the nut 272 may be fixed to the first supporting member 310. A portion of a rear surface of the first supporting member 310 may be exposed through a second through hole 335 of the second supporting member 330, and the nut 272 may be fixed to the rear surface of the first supporting member 310 exposed through the second through hole 335 of the second supporting member 330. The screw 721 of the connection member 270 may be fastened to the nut 272 fixed to the first supporting member 310 through the coupling portion 213, and thus, may couple the second frame 212 to the first supporting member 310. For example, the nut 272 may be a self-clinching nut. Accordingly, the vibration apparatus 200 may be fixed to the supporting member 300. For example, the self-clinching nut may be a PEM® nut, but aspects of the present disclosure are not limited thereto.

The magnet 220 may be disposed on the frame 210. For example, the magnet 220 may be disposed on the first frame 211 of the frame 210. A lower end of the magnet 220 may be supported by the first frame 211, and a periphery of the magnet 220 may be surrounded thereby. The magnet 220 may be disposed at a center of the inner portion of the first frame 211, and the plurality of air penetration hole 215 apart from the magnet 220 may be formed therein. The plurality of air penetration holes 215 may be formed apart from one another by a certain interval along the periphery of the magnet 220. The plurality of air penetration hole 215 may be formed not to overlap with the magnet 220.

The magnet 220 may be a permanent magnet having a ring shape, a cylindrical shape, or an oval shape. The magnet 532 may be implemented with a sintered magnet such as barium ferrite, and a material of the magnet 532 may include one or more of $Fe_2O_3$, $BaCO_3$, a neodymium magnet, strontium ferrite ($Fe_{12}O_{19}Sr$) with improved magnet component, an alloy cast magnet including Al, nickel (Ni), and cobalt (Co). For example, the neodymium magnet may be neodymium-iron-boron (Nd—Fe—B).

The center pole 230 may be disposed on the magnet 220. The center pole 230 may be referred to as pole pieces. In another aspect, the pole pieces may be further provided on the center pole 230.

The bobbin 240 may surround a periphery of the magnet 220. For example, the bobbin 240 may surround the magnet 220 and the center pole 230. The bobbin 240 may be disposed on the frame 210. For example, the bobbin 240 may be disposed on the first frame 211 of the frame 210. The bobbin 240 may be accommodated into the first frame 211. The bobbin 240 may be surrounded by the first frame 211. For example, the bobbin 240 may be disposed between the magnet 220 and the first frame 211.

The bobbin 240 may be attached on the rear surface of the vibration member 100. The bobbin 240 may be attached on the rear surface of the vibration member 100 through a bobbin ring 245. For example, when a current or a voice signal for generating a sound is applied to the coil 250 wound around an outer circumference surface of the bobbin 240, a whole portion of the bobbin 534 may move upward and downward according to Fleming's left-hand rule based on an application magnetic field generated around the coil 535 and an external magnetic field generated around the magnet 220. For example, the bobbin 240 may vibrate the vibration member 100 by using the bobbin ring 245. Also, the vibration member 100 may receive a vibration from the bobbin 240 or the bobbin ring 245 to generate a sound or a sound wave, and the generated sound or sound wave may be output in a forward direction of the vibration member 100.

The bobbin 240 may include a material through which a magnet flux passes and which is low in heat conductivity. For example, the bobbin 240 may be implemented as a ring-shaped (or cylindrical or oval) structure material which includes a material obtained by processing pulp or paper, aluminum (Al), magnesium (Mg), an Al alloy, a Mg alloy, synthetic resin such as polypropylene, or polyamide-based fiber, but aspects of the present disclosure are not limited thereto.

The coil 250 may be wound around an outer circumference surface of the bobbin 240. The coil 250 may be wound around the outer circumference surface of the bobbin 240 and may surround the magnet 220 with being apart therefrom. For example, the coil 250 may be wound around the outer circumference surface of the bobbin 240 and may surround the magnet 220 with being apart therefrom, and thus, may be supplied with a current or a voice signal, used to generate a sound, from the outside. The coil 250 may be referred to as a voice coil. For example, the bobbin 240 and the coil 250 may be referred to as a voice coil. The coil 250 may be wound around a certain region of the bobbin 240. For example, the coil 250 may wound around a lower region of the bobbin 240. The coil 250 may be wound around a lower outer circumference surface of the bobbin 240, and the current or the voice signal for generating a sound may be applied from the outside to the coil 250. For example, when the current or the voice signal is applied to the coil 250, the bobbin 402 may be guided according to Fleming's left-hand rule based on an application magnetic field generated around the coil 250 and a magnetic field generated around the magnet 220 to vibrate. For example, a magnet flux generated by a magnetic field may flow along a closed loop which is connected with the first frame 211, the magnet 220, the center pole 230, and the coil 250. Accordingly, the bobbin 240 may be guided by the damper 260 to vibrate and may transfer a vibration to the vibration member 100.

The damper 260 may be disposed between the first frame 211 and the bobbin 240. For example, one end (or one side) of the damper 260 may be connected with the first frame 211, and the other end (or the other side) of the damper 260 may be connected with the bobbin 240. The damper 260 may be provided in a structure which is creased between the one end and the other end thereof, and thus, may be contracted and relaxed based on a vibration of the bobbin 240 and may adjust and guide a vibration of the bobbin 240, based on a rectilinear reciprocating motion. Therefore, the damper 260 may be connected between the first frame 211 and the bobbin 240, and thus, may limit a vibration distance of the bobbin 240 by using a restoring force. For example, when the bobbin 240 moves by a certain distance or more or vibrates by a certain distance or less, the bobbin 240 may be restored to an original position with the restoring force of the damper 260. For example, the damper 260 may be referred to as other term such as an edge, a spider, or a suspension, but the terms are not limited thereto.

The bobbin ring 245 may be disposed between the bobbin 240 and the vibration member 100 and may transfer a vibration of the bobbin 240 to the vibration member 100. The bobbin ring 245 may be disposed in all of the bobbin 240, but aspects of the present disclosure are not limited thereto and the bobbin ring 245 may be disposed at a position at which the bobbin 240 is disposed. The bobbin ring 245 may be attached on the rear surface of the vibration member 100 by an adhesive member. For example, the adhesive member may be a double-sided tape, a single-sided tape, an adhesive, or a bond, but aspects of the present disclosure are not limited thereto. For example, the bobbin ring 245 may prevent heat occurring in the bobbin 240 from being transferred to the vibration member 100 and may efficiently transfer a vibration of the bobbin 240 to the vibration member 100.

In the apparatus according to an aspect of the present disclosure, a heat dissipation member 150 may be further provided at the rear surface of the vibration member 100 to decrease or reduce heat occurring when the vibration apparatus 200 is vibrating. For example, the heat dissipation member 150 may be disposed at the rear surface of the vibration member 100 by an adhesive member. For example, the adhesive member may be a double-sided tape, a single-sided tape, an adhesive, or a bond, but aspects of the present disclosure are not limited thereto. The heat dissipation member 150 may be provided to have a size which is greater than that of the vibration apparatus 200 or cover the vibration apparatus 200, but aspects of the present disclosure are not limited thereto. For example, the heat dissipation member 150 may contact the bobbin 240 of the vibration apparatus 200. The heat dissipation member 150 may contact the bobbin ring 245 of the vibration apparatus 200. The heat dissipation member 150 may have a size which is greater than that of the bobbin 240 or the bobbin ring 245 of the vibration apparatus 200 contacting each other. The heat dissipation member 150 may have a polygonal plate shape, a circular plate shape, or an oval plate shape having a constant thickness, but aspects of the present disclosure are not limited thereto. For example, the heat dissipation member 150 may be a heat dissipation sheet or a heat dissipation tape including a metal material, having high heat conductivity, such as aluminum (Al), copper (Cu), or silver (Ag) or an alloy thereof, but aspects of the present disclosure are not limited thereto. Accordingly, because the apparatus according to an aspect of the present disclosure further includes the heat dissipation member 150, an adverse effect of heat occurring when the vibration apparatus 200 is vibrating may be reduced on the display panel or the vibration member 100 or the image quality of the display panel.

For example, the heat dissipation member 150 may be attached on the vibration apparatus 200 by an adhesive member. The adhesive member may be a double-sided tape, a single-sided tape, an adhesive, or a bond, but aspects of the present disclosure are not limited thereto. For example, the adhesive member may be disposed between the heat dissipation member 150 and the bobbin 240 or the bobbin ring 245.

A gap space GS (or an internal space) may be provided between the vibration member 100 and the supporting member 300. A partition member 600 providing or limiting the gap space GS may be further provided between the vibration member 100 and the supporting member 300.

The partition member 600 may provide or define the gap space GS which generates a sound when the vibration member 100 is vibrated by the vibration apparatus 200. The partition member 600 may separate the sound generated by the vibration member 100, or may separate a channel, and thus, may prevent or decrease interference of the sound. The partition member 600 may be referred to as an enclosure or a baffle, but the terms are not limited thereto.

The partition member 600 may divide or provide a gap space GS (or an internal space) corresponding to one vibration apparatus 200. For example, the partition member 600 may be provided to surround a periphery of one vibration apparatus 200. The partition member 600 may include four sides surrounding the vibration apparatus 200. For example, the partition member 600 may be implemented in a structure where the four sides are provided as one body, and thus, may be configured in a structure which seals the gap space GS between the vibration member 100 and the supporting member 300 at a periphery of the vibration apparatus 200. As another example, the partition member 600 may include a plurality of open portions which are provided at one or more of the four sides, and thus, may be configured in a structure which does not seal the gap space GS between the vibration member 100 and the supporting member 300 at the periphery of the vibration apparatus 200.

The gap space GS (or the internal space) provided or divided by the partition member 600 may be connected or communicate with the outside of a rear surface of the apparatus through the through holes 315 and 335 (or first hole) of the supporting member 300 and the air penetration hole 215 (or second hole) of the vibration apparatus 200. For example, because the gap space GS provided or divided by the partition member 600 is connected or communicates with the outside of the rear surface of the apparatus through the through holes 315 and 335 of the supporting member 300 and the air penetration hole 215 of the vibration apparatus 200, an air pressure of the gap space GS may decrease. Accordingly, an air pressure of the gap space GS may be reduced by the partition member 600, and thus, an air impedance of the gap space GS may decrease, thereby improving a sound pressure level characteristic and/or a sound characteristic of a low pitched sound band.

According to an aspect of the present disclosure, the partition member 600 may include a material capable of absorbing a vibration or controlling a vibration. The partition member 600 may include a single-sided tape, a single-sided foam tape, a single-sided foam pad, a double-sided tape, a double-sided foam pad, or a double-sided tape, but aspects of the present disclosure are not limited thereto. For example, the partition member 600 may include one or more materials of a silicone-based polymer, paraffin wax, a urethane-based polymer, and an acrylic polymer. For example, the partition member 600 may include a urethane-based material (or substance) having a relatively ductile characteristic among acryl and urethane, to minimize the transfer of a vibration of the vibration member 100 to the supporting member 300.

A plurality of air penetration holes 215 (or second hole) provided in the vibration apparatus 200 according to an aspect of the present disclosure, as illustrated in FIG. 4, may include four air penetration holes 215 which are arranged apart from one another by a certain distance in the first frame 211 of the vibration apparatus 200. Separation distances between the four air penetration holes 215 may be equal to one another, but aspects of the present disclosure are not limited thereto.

The plurality of air penetration holes 215 may be provided to overlap with the bobbin 240 and the coil 250. For example, the plurality of air penetration holes 215 may be arranged apart from one another by a certain distance along shapes of the bobbin 240 and the coil 250. A center portion CL of the plurality of air penetration holes 215 may be provided to overlap with the coil 250. For example, the center portion CL of the plurality of air penetration holes 215 may be provided to overlap with a center of the coil 250.

The plurality of air penetration holes 215 may be arranged in parallel at one side and the other side of a diameter of a circumference shape of the bobbin 240 or the coil 250. For example, the plurality of air penetration holes 215 may be respectively disposed at parallel positions with respect to a diameter in a first direction (or a horizontal direction) and parallel positions with respect to a diameter in a second direction (or a vertical direction), in the circumference shape of the bobbin 240 or the coil 250, but aspects of the present disclosure are not limited thereto. Each of the plurality of air penetration holes 215 may be provided in a circular shape, but aspects of the present disclosure are not limited thereto.

Figure 5:
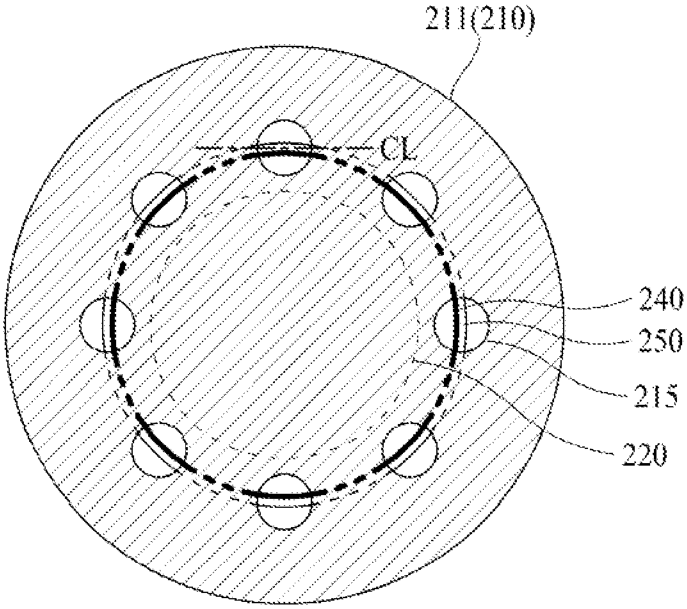
FIGS. 5 to 7 illustrate another arrangement structure of a hole illustrated in FIG. 4.
Figure 6:
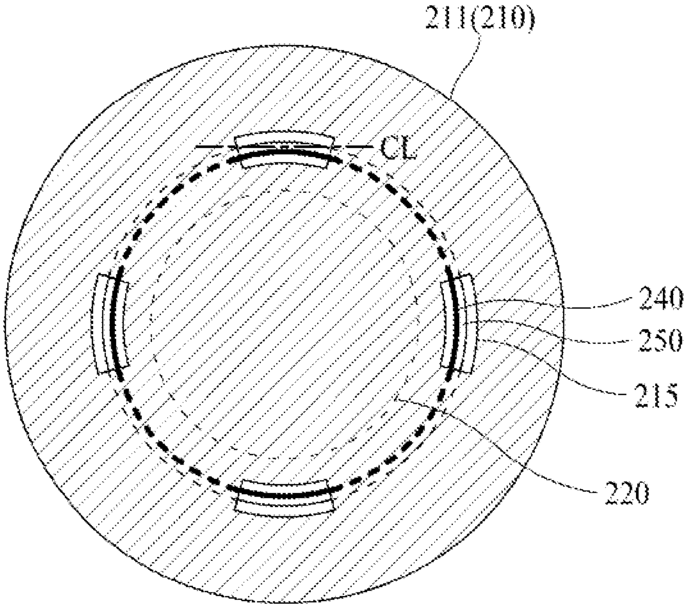
Figure 7:
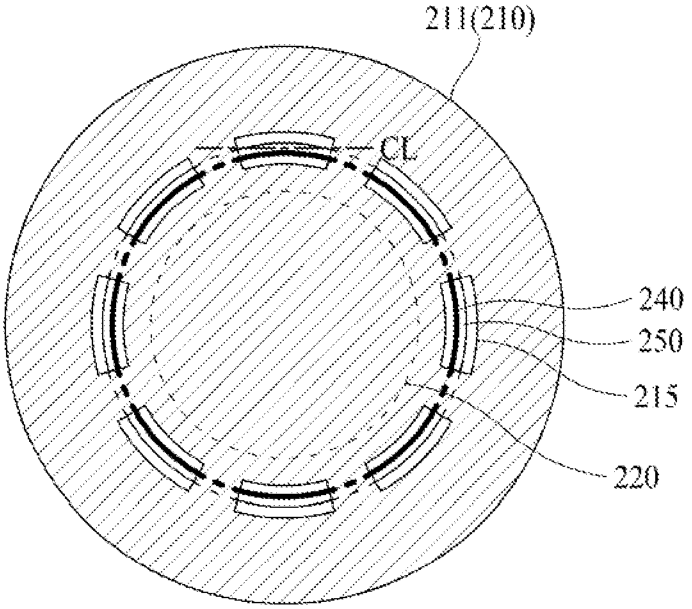

FIGS. 5 to 7 illustrate another arrangement structure of the hole illustrated in FIG. 4.

Referring to FIG. 5, a plurality of air penetration holes 215 (or second hole) according to another aspect of the present disclosure may include eight air penetration holes 215 which are arranged apart from one another by a certain distance in a first frame 211 of a vibration apparatus 200. Separation distances between the eight air penetration holes 215 may be equal to one another, but aspects of the present disclosure are not limited thereto.

The plurality of air penetration holes 215 may be provided to overlap with a bobbin 240 and a coil 250. For example, the plurality of air penetration holes 215 may be arranged apart from one another by a certain distance along shapes of the bobbin 240 and the coil 250. A center portion CL of the plurality of air penetration holes 215 may be provided to overlap with the coil 250. For example, the center portion CL of the plurality of air penetration holes 215 may overlap with a center of the coil 250.

The plurality of air penetration holes 215 may be arranged in parallel at one side and the other side of a diameter of a circumference shape of the bobbin 240 or the coil 250. For example, the plurality of air penetration holes 215 may be respectively disposed at parallel positions with respect to a diameter in a first direction (or a horizontal direction), parallel positions with respect to a diameter in a second direction (or a vertical direction), parallel positions with respect to a diameter in a third direction (or a left diagonal direction) between the first direction and the second direction, and parallel positions with respect to a diameter in a fourth direction (or a right diagonal direction) between the first direction and the second direction, in the circumference shape of the bobbin 240 or the coil 250, but aspects of the present disclosure are not limited thereto. Each of the plurality of air penetration holes 215 may be provided in a circular shape, but aspects of the present disclosure are not limited thereto.

Referring to FIG. 6, a plurality of air penetration holes 215 (or second hole) according to another aspect of the present disclosure may be formed in a slit shape. The plurality of air penetration holes 215 (or second hole) according to another aspect of the present disclosure may include four air penetration holes 215 which are arranged apart from one another by a certain distance in a first frame 211 of a vibration apparatus 200. Separation distances between the four air penetration holes 215 may be equal to one another, but aspects of the present disclosure are not limited thereto.

The plurality of air penetration holes 215 may be provided to overlap with a bobbin 240 and a coil 250. For example, the plurality of air penetration holes 215 may be arranged apart from one another by a certain distance along shapes of the bobbin 240 and the coil 250. The plurality of air penetration holes 215 may be provided in a slit shape extending along the bobbin 240 and the coil 250. A center portion CL of the plurality of air penetration holes 215 may be provided to overlap with the coil 250. For example, the center portion CL of the plurality of air penetration holes 215 may overlap with a center of the coil 250.

The plurality of air penetration holes 215 may be provided in a slit shape extending along a circumference shape of the bobbin 240 or the coil 250. The plurality of air penetration holes 215 may be arranged in parallel at one side and the other side of a diameter of a circumference shape of the bobbin 240 or the coil 250. For example, the plurality of air penetration holes 215 may be respectively disposed at parallel positions with respect to a diameter in a first direction (or a horizontal direction) and parallel positions with respect to a diameter in a second direction (or a vertical direction), but aspects of the present disclosure are not limited thereto.

Referring to FIG. 7, a plurality of air penetration holes 215 (or second hole) according to another aspect of the present disclosure may be formed in a slit shape. The plurality of air penetration holes 215 (or second hole) may include eight air penetration holes 215 which are arranged apart from one another by a certain distance in a first frame 211 of a vibration apparatus 200. Separation distances between the eight air penetration holes 215 may be equal to one another, but aspects of the present disclosure are not limited thereto.

The plurality of air penetration holes 215 may be provided to overlap with a bobbin 240 and a coil 250. For example, the plurality of air penetration holes 215 may be arranged apart from one another by a certain distance along shapes of the bobbin 240 and the coil 250. The plurality of air penetration holes 215 may be provided in a slit shape extending along the bobbin 240 and the coil 250. A center portion CL of the plurality of air penetration holes 215 may be provided to overlap with the coil 250. For example, the center portion CL of the plurality of air penetration holes 215 may overlap with a center of the coil 250.

The plurality of air penetration holes 215 may be provided in a slit shape extending along a circumference shape of the bobbin 240 or the coil 250. The plurality of air penetration holes 215 may be arranged in parallel at one side and the other side of a diameter of a circumference shape of the bobbin 240 or the coil 250. For example, the plurality of air penetration holes 215 may be respectively disposed at parallel positions with respect to a diameter in a first direction (or a horizontal direction), parallel positions with respect to a diameter in a second direction (or a vertical direction), parallel positions with respect to a diameter in a third direction (or a left diagonal direction) between the first direction and the second direction, and parallel positions with respect to a diameter in a fourth direction (or a right diagonal direction) between the first direction and the second direction, in the circumference shape of the bobbin 240 or the coil 250, but aspects of the present disclosure are not limited thereto.

Figure 8:
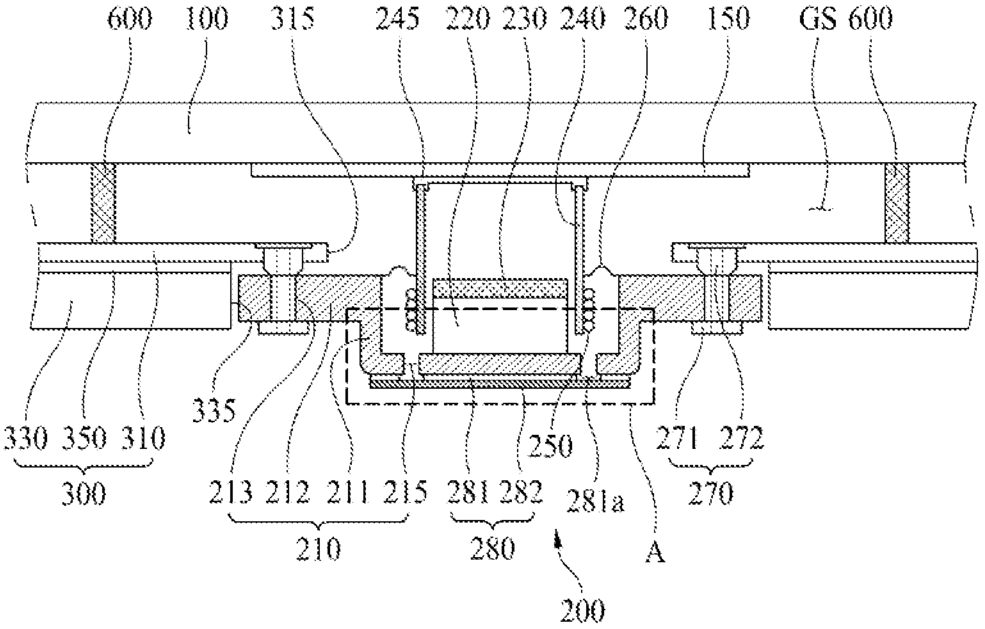
FIG. 8 illustrates a vibration apparatus according to an aspect of the present disclosure.
Figure 9:
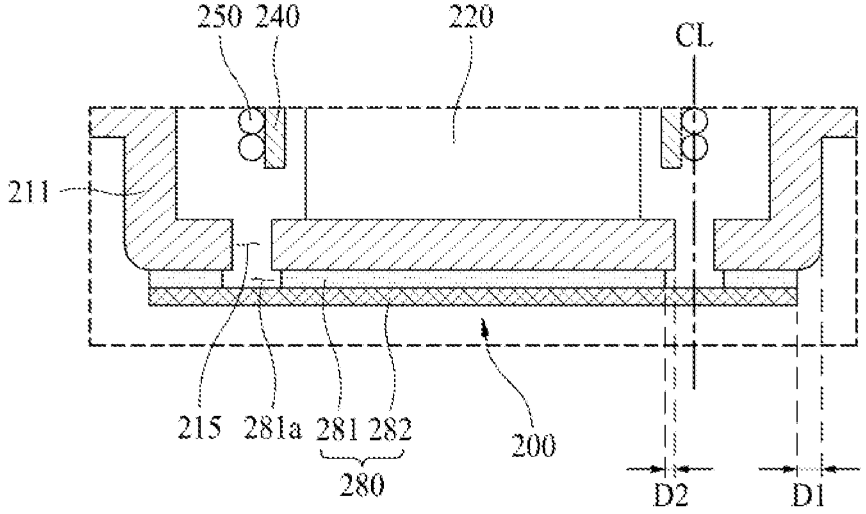
FIG. 9 is an enlarged view of region A of FIG. 8 and illustrates a cover member according to an aspect of the present disclosure.
Figure 10:
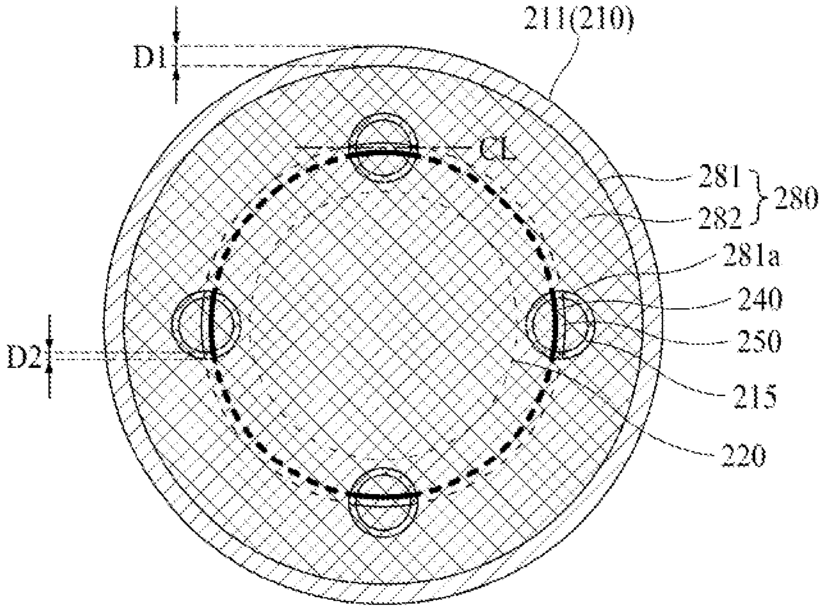
FIG. 10 illustrates a cover member according to an aspect of the present disclosure.

FIG. 8 illustrates a vibration apparatus 200 according to an aspect of the present disclosure. FIG. 9 is an enlarged view of a region A of FIG. 8 and illustrates a cover member according to an aspect of the present disclosure. FIG. 10 illustrates a cover member according to an aspect of the present disclosure. FIGS. 8 to 10 illustrate an aspect where a cover member is additionally provided in the vibration apparatus illustrated in FIG. 3. Therefore, repeated descriptions of the same elements other than a cover member and relevant elements are omitted or will be briefly described below.

Referring to FIGS. 8 to 10, the vibration apparatus 200 according to an aspect of the present disclosure may further include a cover member 280.

The cover member 280 may be disposed at a rear surface of the vibration apparatus 200 and may be configured to cover a plurality of air penetration holes 215 of the vibration apparatus 200. The cover member 280 may contact the rear surface of the vibration apparatus 200. The cover member 280 may contact the rear surface of the vibration apparatus 200 overlapping with the plurality of air penetration holes 215. For example, the cover member 280 may be attached on or coupled to the rear surface of the vibration apparatus 200 overlapping with the plurality of air penetration holes 215. The cover member 280 may be implemented in a mesh structure which prevents the penetration of particles into a gap space GS (or an internal space) between a vibration member 100 and a supporting member 300. For example, the cover member 280 may discharge air of the gap space GS between the vibration member 100 and the supporting member 300 and may prevent the penetration of particles into the gap space GS from the outside. The cover member 280 may be configured to cover the plurality of air penetration holes 215 and may prevent the penetration of particles from the outside through the plurality of air penetration holes 215.

The cover member 280 according to an aspect of the present disclosure, as illustrated in FIGS. 9 and 10, may be attached on or coupled to a rear surface of a first frame 211 of the vibration apparatus 200. The cover member 280 may be attached on or coupled to the rear surface of the first frame 211 to cover the plurality of air penetration holes 215 disposed in the first frame 211.

The cover member 280 may include a mesh portion 282 provided in a mesh structure and a connection portion 281 between the mesh portion 282 and the rear surface of the first frame 211.

The mesh portion 282 may be provided in the mesh structure where a plurality of mesh lines intersect with one another. The mesh portion 282 may include one or more materials of a metal material, a fiber material, and a plastic material, but aspects of the present disclosure are not limited thereto. For example, the mesh portion 282 may be provided through intersections of the mesh lines including a metal material. The mesh portion 282 may be provided through intersections of the mesh lines including a synthetic fiber (or a nylon fiber), a carbon fiber (or an aramid fiber), and a natural fiber.

The mesh portion 282 may be adjusted in air permeability, based on an air hole size based on the mesh structure. An air hole size of the mesh portion 282 may be referred as the number of mesh lines in a unit area (for example, 1 inch). For example, when the number of mesh lines per unit area increases, the air permeability of the mesh portion 282 may be reduced, and when the number of mesh lines per unit area decreases, the air permeability of the mesh portion 282 may increase but external particles may pass through the mesh portion 282. For example, the mesh portion 282 may be configured to have an air hole size for preventing the penetration of external particles and improving a sound pressure level characteristic. In the mesh portion 282, the number of mesh lines per unit area may be within a range of about 200 to about 400, but aspects of the present disclosure are not limited thereto.

The mesh portion 282 may be attached on or coupled to the rear surface of the first frame 211 by a connection portion 281. For example, the connection portion 281 may be a double-sided tape, a single-sided tape, an adhesive, or a bond, but aspects of the present disclosure are not limited thereto.

The mesh portion 282 and the connection portion 281 may be provided to have the same size. For example, the mesh portion 282 may be provided to have a size which is less than or equal to that of the connection portion 281. The mesh portion 282 and the connection portion 281 may be provided to have a size which is less than or equal to that of the rear surface of the first frame 211. For example, the mesh portion 282 and the connection portion 281 may be provided to have a size which is apart from an outer side of the first frame 211 by a certain distance D1.

The connection portion 281 may include a plurality of hollow portions 281*a* respectively corresponding to the plurality of air penetration holes 215 provided in the first frame 211. Each of the plurality of hollow portions 281*a* may be configured to have a size which is greater than or equal to that of a corresponding air penetration hole 215. For example, the plurality of hollow portions 281*a* may be configured to have a size which is apart from the air penetration hole 215 by a certain distance D2.

According to an aspect of the present disclosure, the cover member 280 may be provided to cover the plurality of air penetration holes 215 (or second hole) which are formed to connect or communicate a gap space GS (or internal space) between a vibration member 100 and a supporting member 300 with an external space, and thus, may prevent the penetration of particles from the outside and may discharge the internal air of the gap space GS between the vibration member 100 and the supporting member 300 to the outside or may cause a convection current where air flows in from the outside. Accordingly, heat occurring in the vibration apparatus 200 may be efficiently discharged to the outside, an air pressure of the gap space GS between the vibration member 100 and the supporting member 300 may decrease, and an air impedance of the gap space GS between the vibration member 100 and the supporting member 300 may be reduced, thereby improving a sound pressure level characteristic and/or a sound characteristic of a low pitched sound band.

Figure 11:
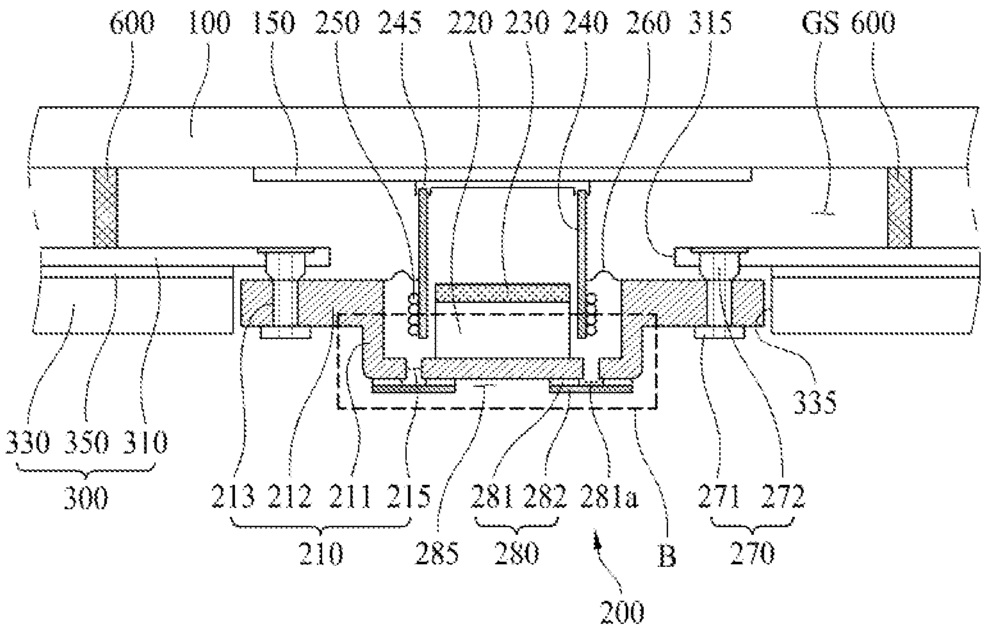
FIG. 11 illustrates a vibration apparatus according to another aspect of the present disclosure.
Figure 12:
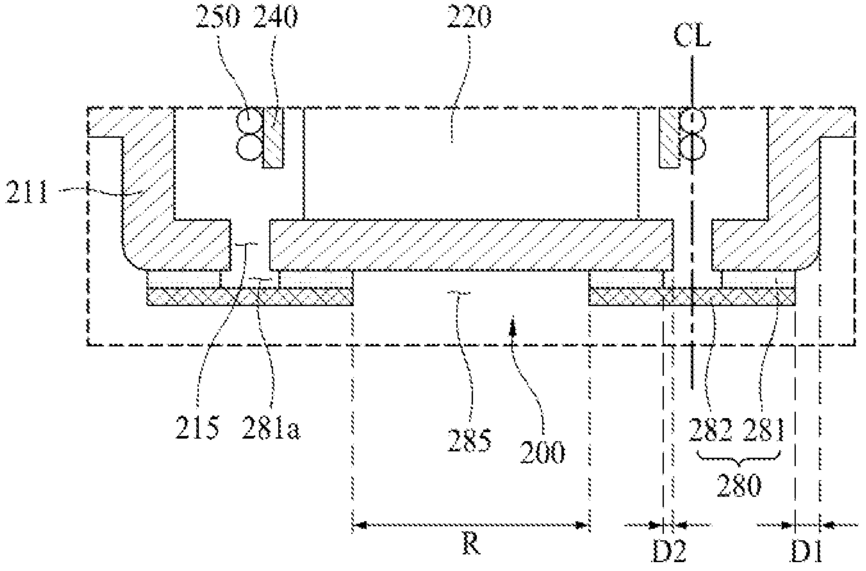
FIG. 12 is an enlarged view of region B of FIG. 11 and illustrates a cover member according to another aspect of the present disclosure.
Figure 13:
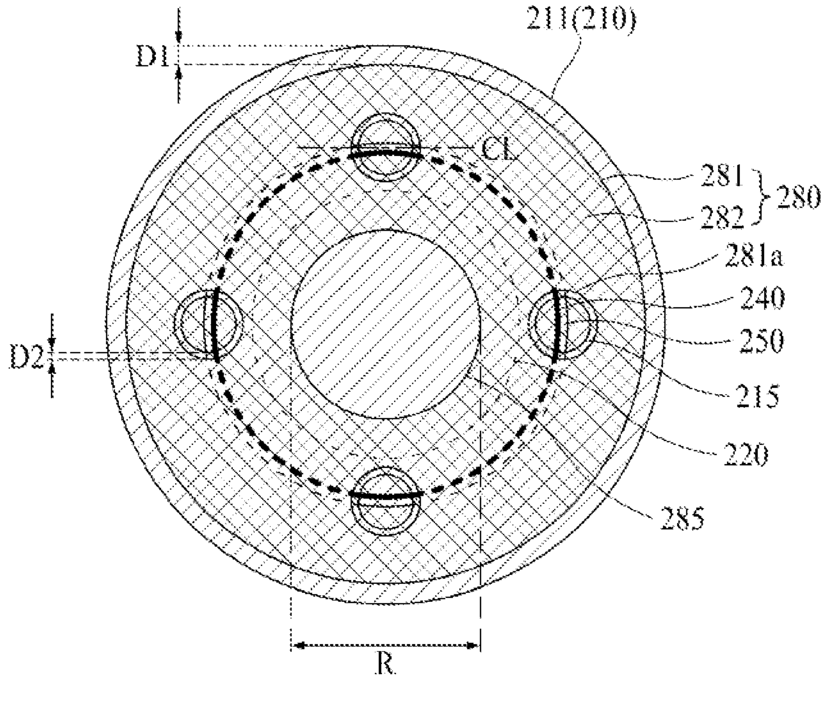
FIG. 13 illustrates a cover member according to another aspect of the present disclosure.

FIG. 11 illustrates a vibration apparatus 200 according to another aspect of the present disclosure. FIG. 12 is an enlarged view of a region B of FIG. 11 and illustrates a cover member according to another aspect of the present disclosure. FIG. 13 illustrates a cover member according to another aspect of the present disclosure. FIGS. 11 to 13 illustrate a structure of the cover member illustrated in FIGS. 8 to 10.

Referring to FIGS. 11 to 13, the vibration apparatus 200 according to another aspect of the present disclosure may further include a cover member 280.

The cover member 280 may be disposed at a rear surface of the vibration apparatus 200 and may be configured to cover a plurality of air penetration holes 215 of the vibration apparatus 200. The cover member 280 may contact the rear surface of the vibration apparatus 200. The cover member 280 may contact the rear surface of the vibration apparatus 200 overlapping with the plurality of air penetration holes 215. For example, the cover member 280 may be attached on or coupled to the rear surface of the vibration apparatus 200 overlapping with the plurality of air penetration holes 215. The cover member 280 may be implemented in a mesh structure which prevents the penetration of particles into a gap space GS (or an internal space) between a vibration member 100 and a supporting member 300. For example, the cover member 280 may discharge air of the gap space GS between the vibration member 100 and the supporting member 300 and may prevent the penetration of particles into the gap space GS from the outside. The cover member 280 may be configured to cover the plurality of air penetration holes 215 and may prevent the penetration of particles from the outside through the plurality of air penetration holes 215.

The cover member 280 according to an aspect of the present disclosure may further include an opening 285 which is in a portion, which does not overlap with the plurality of air penetration holes 215, of the rear surface of the vibration apparatus 200.

The cover member 280 according to an aspect of the present disclosure, as illustrated in FIGS. 12 and 13, may be attached on or coupled to a rear surface of a first frame 211 of the vibration apparatus 200. The cover member 280 may be attached on or coupled to the rear surface of the first frame 211 to cover the plurality of air penetration holes 215 disposed in the first frame 211. The opening 285 may be formed in a portion which does not overlap with the plurality of air penetration holes 215.

The opening 285 of the cover member 280 may be disposed at a center portion of the cover member 280. The cover member 280 may be provided in a circular shape, a polygonal shape, or a donut shape, where the opening 285 is at a center portion thereof, but aspects of the present disclosure are not limited thereto. The opening 285 of the cover member 280 may be configured to have a diameter R having a certain length. The diameter R of the opening 285 of the cover member 280 may be configured so that an outer portion and an inner portion have the same length with the air penetration hole 215 therebetween in the cover member 280.

According to an aspect of the present disclosure, the cover member 280 may be provided to cover the plurality of air penetration holes 215 (or second hole) which are formed to connect or communicate the gap space GS (or internal space) between the vibration member 100 and the supporting member 300 with an external space, and thus, may prevent the penetration of particles from the outside and may discharge the internal air of the gap space GS between the vibration member 100 and the supporting member 300 to the outside or may cause a convection current where air flows in from the outside. Accordingly, heat occurring in the vibration apparatus 200 may be efficiently discharged to the outside, an air pressure of the gap space GS between the vibration member 100 and the supporting member 300 may decrease, and an air impedance of the gap space GS between the vibration member 100 and the supporting member 300 may be reduced, thereby improving a sound pressure level characteristic and/or a sound characteristic of a low pitched sound band.

The apparatus according to an aspect of the present disclosure may be applied to a vibration generating apparatus and/or a sound generating apparatus. The apparatus according to an aspect of the present disclosure may be applied to mobile devices, video phones, smart watches, watch phones, wearable apparatuses, foldable apparatuses, rollable apparatuses, bendable apparatuses, flexible apparatuses, curved apparatuses, sliding apparatuses, variable apparatuses, electronic organizers, e-books, portable multimedia players (PMPs), personal digital assistants (PDAs), MP3 players, mobile medical apparatuses, desktop personal computers (PCs), laptop PCs, netbook computers, workstations, navigation devices, automotive navigation devices, automotive display apparatuses, automotive apparatuses, cinema display apparatuses, televisions (TVs), wall paper display apparatuses, signage apparatuses, game machines, notebook computers, monitors, cameras, camcorders, home appliances, etc.

An apparatus according to various aspects of the present disclosure will be described below.

An apparatus according to various aspects of the present disclosure may include a vibration member, a supporting member at a rear surface of the vibration member, the supporting member including at least one first hole, a vibration apparatus accommodated into the at least one first hole, the vibration apparatus including a plurality of second holes, and a cover member covering the plurality of second holes.

According to various aspects of the present disclosure, the at least one first hole may overlap with the vibration apparatus.

According to various aspects of the present disclosure, the plurality of second holes may overlap with the at least one first hole.

According to various aspects of the present disclosure, the plurality of second holes may be configured in one of a circular shape, an oval shape, and a slit shape.

According to various aspects of the present disclosure, an internal space between the vibration member and the supporting member may communicate with an external space through the at least one first hole and the plurality of second holes.

According to various aspects of the present disclosure, the cover member may contact a rear surface of the vibration apparatus overlapping with the plurality of second holes.

According to various aspects of the present disclosure, the vibration apparatus may be accommodated into the at least one first hole and is fixed to the supporting member.

According to various aspects of the present disclosure, the vibration apparatus may include a frame connected with the supporting member, the frame including the plurality of second holes, a magnet on the frame, a bobbin around the magnet, and a coil around the bobbin.

According to various aspects of the present disclosure, the plurality of second holes may overlap with the bobbin and the coil.

According to various aspects of the present disclosure, a center portion of each of the plurality of second holes may overlap with the coil.

According to various aspects of the present disclosure, the plurality of second holes may be arranged apart from one another by a certain distance along a shape of each of the bobbin and the coil.

According to various aspects of the present disclosure, the frame may be configured in a thermal conductive material.

According to various aspects of the present disclosure, the cover member may contact a rear surface of the frame overlapping with the plurality of second holes.

According to various aspects of the present disclosure, the frame may include a first frame into which the magnet, the bobbin, and the coil are accommodated, and a second frame fixed to the supporting member, the second frame protruding from an edge of the first frame.

According to various aspects of the present disclosure, the plurality of second holes may be disposed in the first frame.

According to various aspects of the present disclosure, the cover member may contact a rear surface of the first frame overlapping with the plurality of second holes.

According to various aspects of the present disclosure, the cover member may be configured in a mesh structure which prevents external particles from penetrating into the plurality of second holes.

According to various aspects of the present disclosure, the cover member may include a mesh portion provided in the mesh structure, and a connection portion between the mesh portion and the rear surface of the vibration apparatus.

According to various aspects of the present disclosure, the mesh portion and the connection portion may be configured to have the same size.

According to various aspects of the present disclosure, the connection portion may include a hollow portion corresponding to each of the plurality of second holes and having a size which is greater than or equal to a size of each of the plurality of second holes.

According to various aspects of the present disclosure, the hollow portion of the connection portion may be configured in a shape corresponding to a shape of each of the plurality of second holes.

According to various aspects of the present disclosure, the cover member may include an opening provided in a portion which does not overlap with the plurality of second holes.

According to various aspects of the present disclosure, the opening of the cover member may be disposed in a center portion of the cover member.

According to various aspects of the present disclosure, the vibration member may include one or more materials of metal, plastic, fiber, leather, wood, cloth, rubber, carbon, glass, and paper.

The above-described feature, structure, and effect of the present disclosure are included in at least one aspect of the present disclosure, but are not limited to only one aspect. Furthermore, the feature, structure, and effect described in at least one aspect of the present disclosure may be implemented through combination or modification of other aspects by those skilled in the art. Therefore, content associated with the combination and modification should be construed as being within the scope of the present disclosure. It will be apparent to those skilled in the art that various modifications and variations may be made in the present disclosure without departing from the spirit or scope of the disclosures. Thus, it is intended that the present disclosure covers the modifications and variations of this disclosure provided they come within the scope of the appended claims and their equivalents.

What is claimed is:

1. An apparatus for providing a sound comprising:
- a vibration member;
- a supporting member disposed at a rear surface of the vibration member, the supporting member including at least one first hole;
- a vibration apparatus accommodated into the at least one first hole, the vibration apparatus including a plurality of second holes; and
- a cover member covering the plurality of second holes, wherein the vibration apparatus comprises:
- a frame connected with the supporting member and including the plurality of second holes;
- a magnet disposed on the frame;
- a bobbin disposed around the magnet; and
- a coil disposed around the bobbin, and wherein the frame comprises:
- a first frame into which the magnet, the bobbin, and the coil are accommodated; and
- a second frame fixed to the supporting member, the second frame protruding from an edge of the first frame.

2. The apparatus of claim 1, wherein the at least one first hole overlaps with the vibration apparatus.

3. The apparatus of claim 1, wherein the plurality of second holes overlap with the at least one first hole.

4. The apparatus of claim 1, wherein the plurality of second holes are configured in one of a circular shape, an oval shape, and a slit shape.

5. The apparatus of claim 1, wherein an internal space between the vibration member and the supporting member communicates with an external space through the at least one first hole and the plurality of second holes.

6. The apparatus of claim 1, wherein the cover member contacts a rear surface of the vibration apparatus overlapping with the plurality of second holes.

7. The apparatus of claim 1, wherein the vibration apparatus is accommodated into the at least one first hole and is fixed to the supporting member.

8. The apparatus of claim 1, wherein the plurality of second holes overlap with the bobbin and the coil.

9. The apparatus of claim 1, wherein a center portion of each of the plurality of second holes overlaps with the coil.

10. The apparatus of claim 1, wherein the plurality of second holes are arranged apart from one another by a certain distance along a shape of each of the bobbin and the coil.

11. The apparatus of claim 1, wherein the frame is configured in a thermal conductive material.

12. The apparatus of claim 1, wherein the cover member contacts a rear surface of the frame overlapping with the plurality of second holes.

13. The apparatus of claim 1, wherein the plurality of second holes are disposed in the first frame.

14. The apparatus of claim 13, wherein the cover member contacts a rear surface of the first frame overlapping with the plurality of second holes.

15. The apparatus of claim 1, wherein the cover member is configured in a mesh structure which prevents external particles from penetrating into the plurality of second holes.

16. The apparatus of claim 15, wherein the cover member comprises:
- a mesh portion provided in the mesh structure; and
- a connection portion between the mesh portion and the rear surface of the vibration apparatus.

17. The apparatus of claim 16, wherein the mesh portion and the connection portion are configured to have a same size.

18. The apparatus of claim 16, wherein the connection portion includes a hollow portion corresponding to each of the plurality of second holes and has a size which is greater than or equal to a size of each of the plurality of second holes.

19. The apparatus of claim 18, wherein the hollow portion of the connection portion is configured in a shape corresponding to a shape of each of the plurality of second holes.

20. The apparatus of claim 16, wherein the cover member comprises an opening provided in a portion which does not overlap with the plurality of second holes.

21. The apparatus of claim 20, wherein the opening of the cover member is disposed in a center portion of the cover member.

22. The apparatus of claim 1, wherein the vibration member comprises one or more materials of metal, plastic, fiber, leather, wood, cloth, rubber, carbon, glass, and paper.

* * * * *